United States Patent [19]

Ozaki

[11] Patent Number: 4,656,644
[45] Date of Patent: Apr. 7, 1987

[54] DIGITAL RADIO RECEIVING APPARATUS

[75] Inventor: Takayuki Ozaki, Nasu, Japan

[73] Assignee: Fujitsu Limited, Kawasaki, Japan

[21] Appl. No.: 659,963

[22] Filed: Oct. 11, 1984

[30] Foreign Application Priority Data

| Oct. 14, 1983 | [JP] | Japan | 58-191026 |
| Oct. 14, 1983 | [JP] | Japan | 58-191029 |
| Mar. 13, 1984 | [JP] | Japan | 59-47818 |

[51] Int. Cl.$^4$ .................................. H04B 3/04
[52] U.S. Cl. .................................. 375/14; 375/15; 375/103; 371/57
[58] Field of Search .............. 375/12, 13, 99, 14, 375/15, 103; 333/18, 28 R; 328/162; 364/574, 724, 825; 455/229, 311, 312; 340/825.17; 371/48, 57

[56] References Cited

U.S. PATENT DOCUMENTS

| 4,152,649 | 5/1979 | Choquet | 375/13 |
| 4,320,517 | 3/1982 | Godard et al. | 375/14 |
| 4,343,041 | 8/1982 | Forney, Jr. | 375/14 |
| 4,453,256 | 6/1984 | Ryu | 375/15 |
| 4,483,009 | 11/1984 | Honda et al. | 375/14 |

FOREIGN PATENT DOCUMENTS

56-80944 7/1981 Japan .

Primary Examiner—Benedict V. Safourek
Attorney, Agent, or Firm—Staas & Halsey

[57] ABSTRACT

A digital radio receiving apparatus includes a transversal demodulator which is controlled under an internal control mode and an external control mode selectively by means of a control circuit. The control circuit operates under the external control mode every time an alarm signal is issued when the transversal modulator functions in an abnormal operation state due to fading. In the external control mode, the control circuit produces an optimum control signal for elimination of the alarm signal.

21 Claims, 16 Drawing Figures

DIGITAL RADIO RECEIVING APPARATUS

BACKGROUND OF THE INVENTION

1. Field of the Invention

The present invention relates to a digital radio receiving apparatus used in a radio communication system for transferring digital data, more particularly, a digital radio receiving apparatus having of a transversal demodulator unit included therein.

2. Description of the Related Art

A digital radio communication system can be operated under a variety of known methods. Among the usual methods, a phase shift keying (PSK) method and quadrature amplitude modulation (QAM) method are suitable for transferring large amounts of data within a limited frequency band. A digital radio communication system operated under the PSK or QAM method, however, often is subject to transmission distortion in the transmission band due to fading and waveform deterioration due to inter symbol interference.

In order to deal with this distortion and deterioration, the digital radio receiving apparatus is usually equipped with a demodulator unit able to equalize a received signal in which transmission distortion and waveform deterioration occur in an intermediate frequency (IF) band or the baseband. This demodulator unit, known as a transversal demodulator unit, includes therein a transversal equalizer and a carrier recovery circuit. In the unit, a carrier wave is reproduced from the received signal. Then the received signal is synchronously detected using the thus reproduced carrier wave, and an original data signal is obtained through level discriminations of the thus synchronously detected signal.

A digital radio receiving apparatus having a transversal demodulator often does not accurately reproduce the data due to certain types of signal disturbance. Specifically, there is no difficulty reproducing data when the carrier recovery circuit is first set in the normal operation state, i.e., synchronous detection is normally performed, and then the transversal equalizer starts its equalization operation. The carrier recovery circuit can be maintained in its normal operation state even if the distortions of the received signal increase to a considerably high level, since the so-called eye pattern can be opened, to match increases in the distortion level, by operation of the transversal equalizer. Contrary to the above, there is difficulty reproducing the data when a received signal having a considerably larger amount of distortion, is received by the demodulator unit before the synchronous detection by the carrier recovery circuit is complete. That is, the carrier recovery circuit can not reach its normal operation state, since, under this circumstance, the so-called tap coefficients of the transversal equalizer deviate from their optimum values by a large amount.

In order to eliminate this trouble, there is known the prior art a technique using a so-called "training pattern". A training pattern, however, is not very practical in actual use with a radio transmission line. The training pattern is useful for a wire transmission line due to the wide frequency spectrum used to complete an initial condition setting. In a radio transmission line, however, such a wide frequency spectrum cannot be used due to inherent conditions of the spatial media through which the radio transmission line is created.

SUMMARY OF THE INVENTION

Accordingly, it is an object of the present invention to provide a digital radio receiving apparatus having a transversal modulator unit in which a carrier recovery circuit therein can rapidly assume its normal operation state, i.e., rapid synchronous detection can be achieved therein, even when a signal having a large amount of distortion is received.

The above object is basically attained by the following. In a digital receiving apparatus having a transversal modulator with a carrier recovery circuit, an external control path is employed. The external control path and an internal control loop are selectively linked with an equalizing part in the transversal modulator. The external control path is selected when an alarm signal is generated and cooperates with a control circuit. The control circuit provides a control signal to the external control path, which control signal has control information suitable for eliminating the alarm signal which is generated when the carrier recovery circuit is out of synchronization.

BRIEF DESCRIPTION OF THE DRAWINGS

The present invention will be more apparent from the ensuing description with reference to the accompanying drawings, wherein.

DESCRIPTION OF THE PREFERRED EMBODIMENTS

Figure 1:
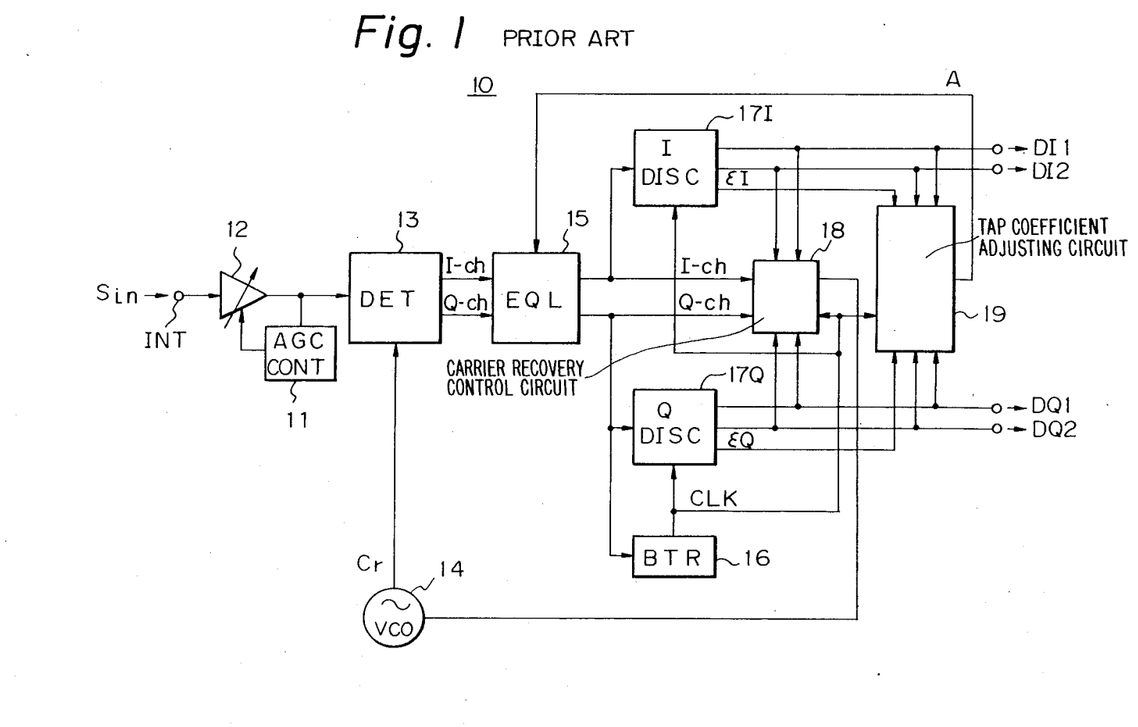
FIG. 1 is a general block diagram of a conventional digital radio receiving apparatus.

Before describing the preferred embodiments, a brief discussion will be made of a conventional digital radio receiving apparatus. FIG. 1 is general block diagram of a conventional digital radio receiving apparatus. The digital radio receiving apparatus 10 is constructed to operate under, for example, the 16-value QAM method.

An IF received signal $S_{in}$ is applied to an input terminal INT and processed in the receiver 10 to produce both an in-phase (I)-channel (ch) data set DI1 and DI2 and a quadrature (Q)-ch data set DQ1 and DQ2 by the operation of a detector 13, a transversal equalizer (EQL) 15, a carrier recovery circuit, and an equalizing part. The equalizing part is chiefly comprised of a tap coefficient adjusting circuit (TPA) 19. A carrier recovery control circuit (CRC) 18 is provided with a voltage controlled oscillator (VCO) 14, to form, as one unit, the carrier recovery circuit.

The IF received signal $S_{in}$ is applied, usually via a variable gain amplifier 12, to the detector 13 with the aid of an automatic gain controller (AGC) 11. The variable gain amplifier 12 and AGC 11 are optional and sometimes are omitted. The IF received signal from the amplifier 12, if included, is applied to the detector 13, in which orthogonal detection is achieved in synchronization with the output signal from the VCO 14, whereby a baseband signal of I-ch and a baseband signal of Q-ch are produced. The transversal equalizer 15 receives both I-ch and Q-ch baseband signals and operates to equalize the waveform distortions thereof. A bit timing recovery (BTR) circuit 16 receives either one of the thus equalized I- and Q-ch baseband signals, i.e., the Q-ch signal in this figure, and operates to extract a clock signal CLK therefrom. The clock signal CLK is commonly supplied to an I-ch discriminator (I-DISC) 17I, a Q-ch discriminator (Q-DISC) 17Q, the carrier recovery control circuit 18, and the tap coefficient adjusting circuit 19.

The I- and Q-ch discriminators 17I and 17Q receive I- and Q-ch base band signals and operate to discriminate these signals bit by bit so as to produce each bit of the I-ch data set DI1 and DI2 and each bit of the Q-ch data set DQ1 and DQ2, respectively. At the same time so-called error signals $\epsilon I$ and $\epsilon Q$ are also generated therefrom. Each of the error signals $\epsilon I$ and $\epsilon Q$ indicates an error in polarity, relative to a predetermined threshold level of the output signal level from the equalizer 15.

The carrier recovery control circuit 18 cooperates with the VCO 14 in such a manner as to minimize error in phases between the IF received signal $S_{in}$ and a reference carrier wave Cr, i.e., the output signal from the VCO 14, in response to the equalized I- and Q-ch baseband signals from the equalizer 15 and the I- and Q-ch data sets from the I- and Q-ch discriminators 17I and 17Q.

The tap coefficient adjusting circuit (TPA) 19 receives the I- and Q-ch data sets DI1 and DI2 and DQ1 and DQ2 and also the error signals $\epsilon I$ and $\epsilon Q$ to determine suitable tap coefficients for suppressing the waveform distortions and adjusting the baseband signal levels from the detector 13. The thus determined tap coefficients are supplied to the transversal equalizer 15. Accordingly, the discrimination operation can be correctly achieved in each of the discriminators 17I and 17Q.

Figure 2:
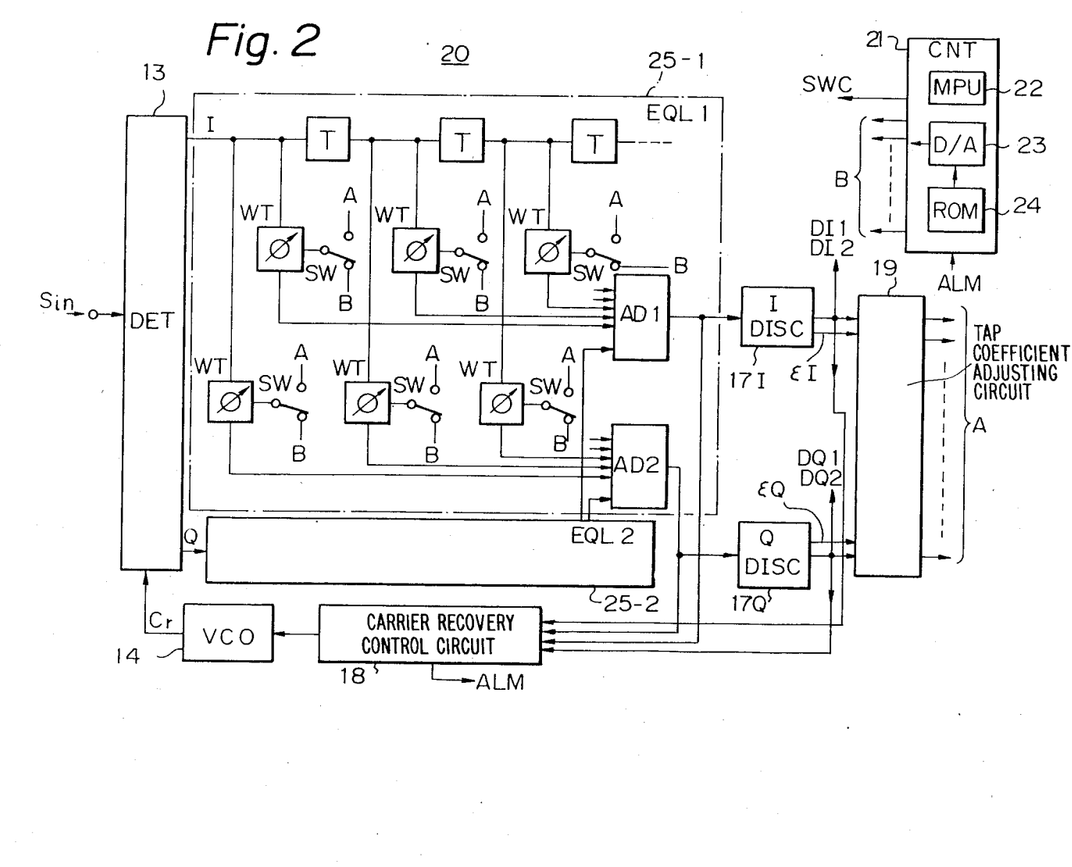
FIG. 2 is a general block diagram of a digital radio receiving apparatus according to a first embodiment of the present invention.

FIG. 2 is a general block diagram of a digital radio receiving apparatus according to a first embodiment of the present invention. In FIG. 2 and later figures, members substantially the same as those of FIG. 1 are represented by the same reference numerals and characters. Members which are not important for the embodiments are not illustrated. In the digital radio receiving apparatus 20, the detected I- and Q-ch base band signals I and Q are input to a first transversal equalizer (EQL1) 25-1 and a second transversal equalizer (EQL2) 25-2, respectively. These transversal equalizers 25-1 and 25-2 are basically identical to the transversal equalizer (EQL) 15 shown in FIG. 1. Since the equalizers 25-1 and 25-2 have the same construction, only the equalizer 25-1 is illustrated in detail. The equalizer 25-1 is comprised of a plurality of time delay elements T, a plurality of weighting elements WT, each comprised of a phase shifter, a plurality of switches SW, and first and second adders AD1 and AD2. Of these, the switches SW are characteristic of the present invention, while the other members are already provided for other purposes in the apparatus.

Each of the switches SW function to select either an internal control loop (A) or external control path (B) for individual weighting elements WT in response to a switch control signal SWC and supplies an individual control signal B to the weighting elements during selection of the external control path (B). The switch control signal SWC and the control signals B are supplied by a control circuit (CNT) 21, which is also characteristic of the present invention. In this case, the control signals B are transferred by way of the external control paths, while the usual tap control signals A are transferred by way of the internal control loops. The internal control loop is specifically shown by A in FIG. 1.

The control circuit 21 may be formed in various ways, but in FIG. 2, it is formed by using a microprocessor unit (MPU) 22. The MPU 22 controls a read only memory (ROM) 24 and a digital/analog converter (D/A) 23. The ROM 24 stores therein a variety of predetermined control data. The control data, i.e., tap control data, are sequentially read therefrom one by one and supplied, via the converter 23, to respective weighting elements WT.

The control circuit 21 is activated every time an alarm signal ALM is given thereto. The alarm signal ALM is issued when the distortions of the IF received signal $S_{in}$ increase to a predetermined high level. Accordingly, in this case, the tap coefficients of the weighting elements WT deviate from their respective optimum values and, therefore, the carrier recovery circuit (14, 18) can no longer be put in its normal state, i.e., a synchronization state. The alarm signal ALM is usually issued from the carrier recovery control circuit 18 as shown in FIG. 2, but an identical alarm signal ALM may also be generated by, for example, the I-ch discriminator 17I by observing a discrimination error rate. Some method of generating an alarm is normally provided a conventional transversal demodulator unit.

When the alarm signal ALM is issued, the MPU 22 issues a command, on one hand, to activate the switch control signal SWC to select the external control paths (B), and on the other hand, to read a group of tap control data from the ROM 24, sequentially. A variety of tap control data is stored, in advance, for expected alarm (waveform distortion) conditions. Conversely, when no alarm signal ALM is issued, it is considered that the radio transmission line is in a normal state. In this case, the usual internal control loops (A) are selected, so that optimum tap coefficients are supplied from the tap coefficient adjusting circuit 19 to the weighting elements WT as usual, to establish a suitable pulse response characteristic.

Figure 3:
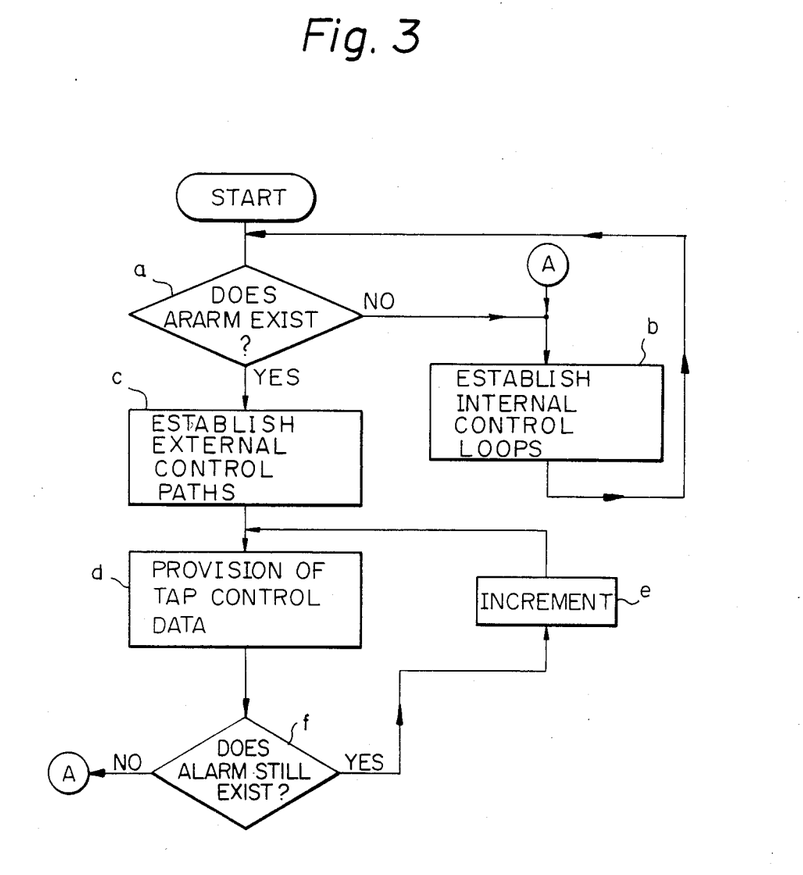
FIG. 3 is a flow chart of successive steps processed under control of a microprocessor unit shown in FIG. 2.

FIG. 3 is a flow chart of successive steps processed under control of the microprocessor unit 22 shown in FIG. 2. The microprocessor unit (MPU) 22 determines whether the alarm signal ALM exists, at step "a". If the alarm ALM does not exist, the usual internal control loops (A) are established at step "b", i.e., so-called automatic equalization is achieved by means of the tap coefficient adjusting circuit 19. Conversely, if the alarm ALM does exist, the external control paths (B) are established as step "c", by applying the switch control signal SWC from the control circuit 21 to the switches SW to select the paths (B). Soon after this, at step "d", the MPU 22 accesses the ROM 24 and reads therefrom the aforesaid control data. The first control data to be read specifies a tap coefficient value which can cope with the first mode of the waveform distortion most likely to occur. Then, the transversal equalizers 25-1 and 25-2 are operated with the use of the aforesaid first control data. Under this condition, if the alarm signal ALM still exists (step "f"), that is, the waveform distortion concerned is not completely equalized, the second control data is read, via step "e". The second control data specifies another tap coefficient value which can cope with a second mode of waveform distortion next most likely to occur after the first mode of waveform distortion. Operations similar to the above are repeated until the alarm signal ALM is eliminated. When no alarm signal is issued, at step "f", the usual automatic equalization starts again at step "b". Accordingly, even though the carrier recovery control circuit 18 leaves of the synchronization state, it can be rstored to its normal state rapidly by utilizing, through the above-explained procedure, the most suitable one of the external control data.

Figure 4:
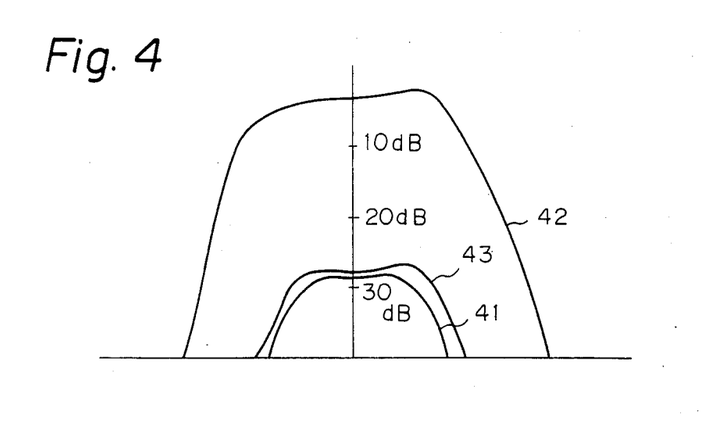
FIG. 4 is a graph showing one example of signature curves.

FIG. 4 is a graph showing an example of signature curves. In FIG. 4, the abscissa indicates notch frequencies, with a center frequency of, for example, 140 MHz, and the ordinate indicates the so-called depth frequency in dB. A curve 41 represents an equalization range in which the so-called error rate can be maintained lower than $10^{-3}$ when the carrier recovery circuit is operated in the synchronization state. A curve 42 represents an equalization range of the prior art in which the carrier recovery circuit can be restored to its normal state, i.e., the synchronization state, after leaving that state. This means that, in the prior art, the capability for restoring the carrier recovery circuit to its normal state is lost with a reduction of the depth frequency of just several dB. Contrary to the above, according to the present invention, an equalization range 43 can be obtained when the carrier recovery circuit is restored to the synchronization state after an alarm signal has been issued. Thus, the capability for restoration to the normal state is comparable with the range 41.

Figure 5:
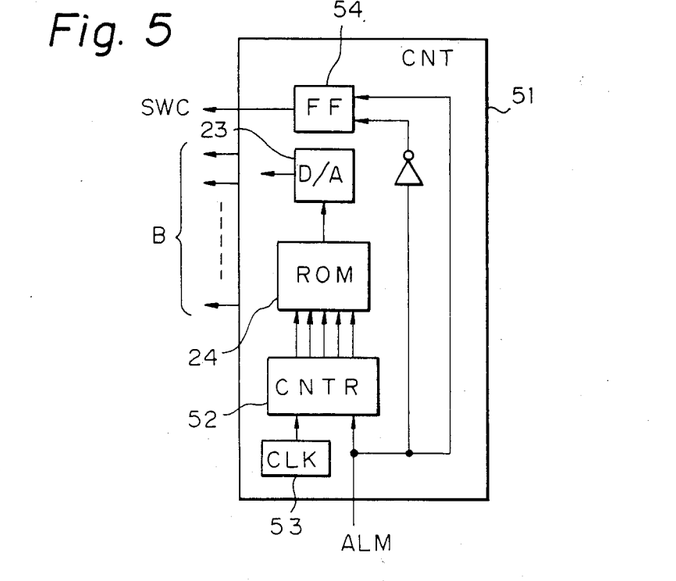
FIG. 5 is a block diagram of an example of a modified control circuit for use in the embodiment illustrated in FIG. 2.

FIG. 5 is a block diagram of another example of the control circuit. The control circuit 21 of FIG. 2 is operated under commands from the MPU 22. However, in FIG. 5, another control circuit 51 is operated without such an MPU. When an alarm signal ALM is given to the control circuit 51, a flip-flop (FF) is set thereby and produces a switch control signal SWC. At the same time, the alarm signal ALM controls a counter (CNTR) 52 to start incrementally counting clock pulses supplied from a clock generator (CLK) 53. Thus, the counter 52 produces address signals one by one and accesses the ROM 24. When the alarm signal ALM ceases, the flip-flop 54 is reset and the signal SWC is not produced. At the same time, the counter 52 is cleared to zero.

The digital radio receiving apparatus 20 of FIG. 2 performs therein the equalization in the baseband range. That is, the equalizers 25-1 and 25-2 are mounted at the output side of the detector 13. However, the basic idea of the present invention can also be realized in a digital radio receiving apparatus in which the equalization is performed in the IF band range. This will be clarified with reference to FIG. 6.

Figure 6:
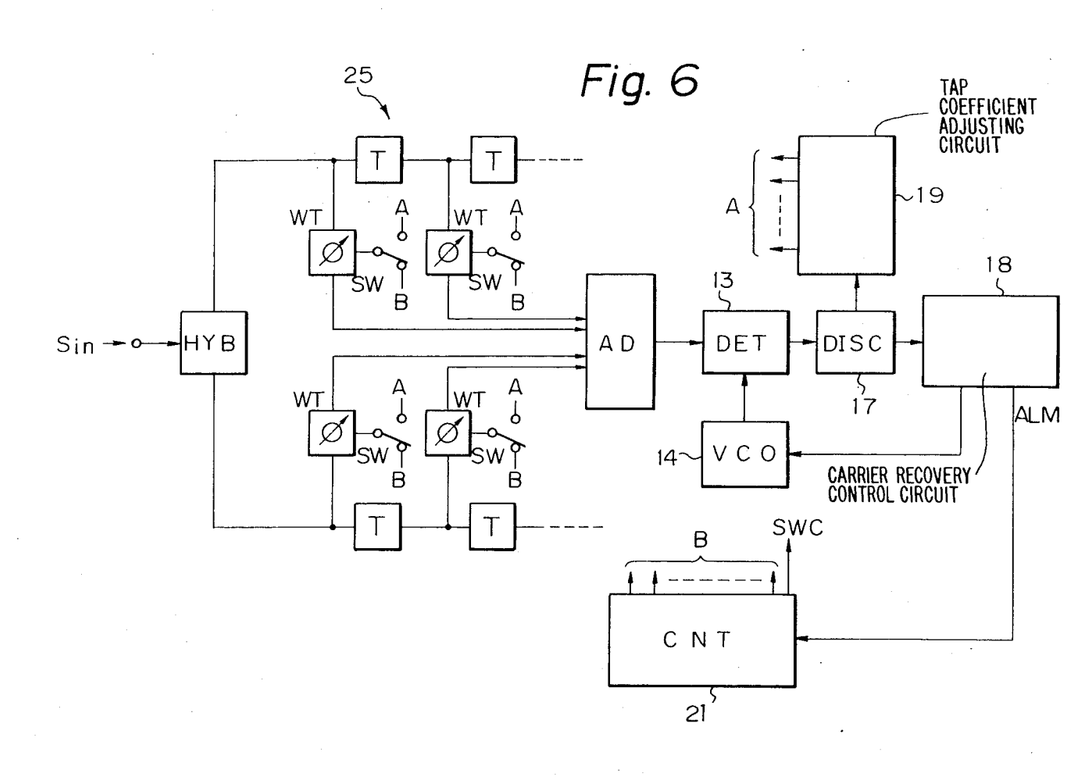
FIG. 6 is a block diagram of a modification of the digital radio receiving apparatus shown in FIG. 2.

FIG. 6 illustrates a modification of the digital radio receiving apparatus shown in FIG. 2. As seen from FIG. 6, the transversal equalizer 25 is directly supplied, via a hybrid circuit HYB, with the IF received signal $S_{in}$. The thus equalized signal is then detected by the detector 13. The operations for establishing the internal control loops (A) and the external control paths (B) are identical to those explained with reference to FIG. 2.

It should be understood that the aforesaid modification represented by FIG. 6 is also true of other embodiments. It is apparent that the hardware arrangement illustrated in FIG. 6 is somewhat simpler than that of FIG. 2. Further, in the first embodiment illustrated in FIG. 2, it is not always necessary to mount the switches SW to all the taps, i.e., all the weighting elements WT. It is possible to mount them to some of the taps. This is also true of the other embodiments. Furthermore, in the first embodiment of FIG. 2, each of the switches SW is illustrated schematically in the form of a mechanical changeover switch. However, each switch SW can be constructed as a semiconductor switch. Alternatively, the switch SW can be realized by a wired OR adder receiving the control signals A and B on the same line. This is also true of the other embodiments.

Figure 7:
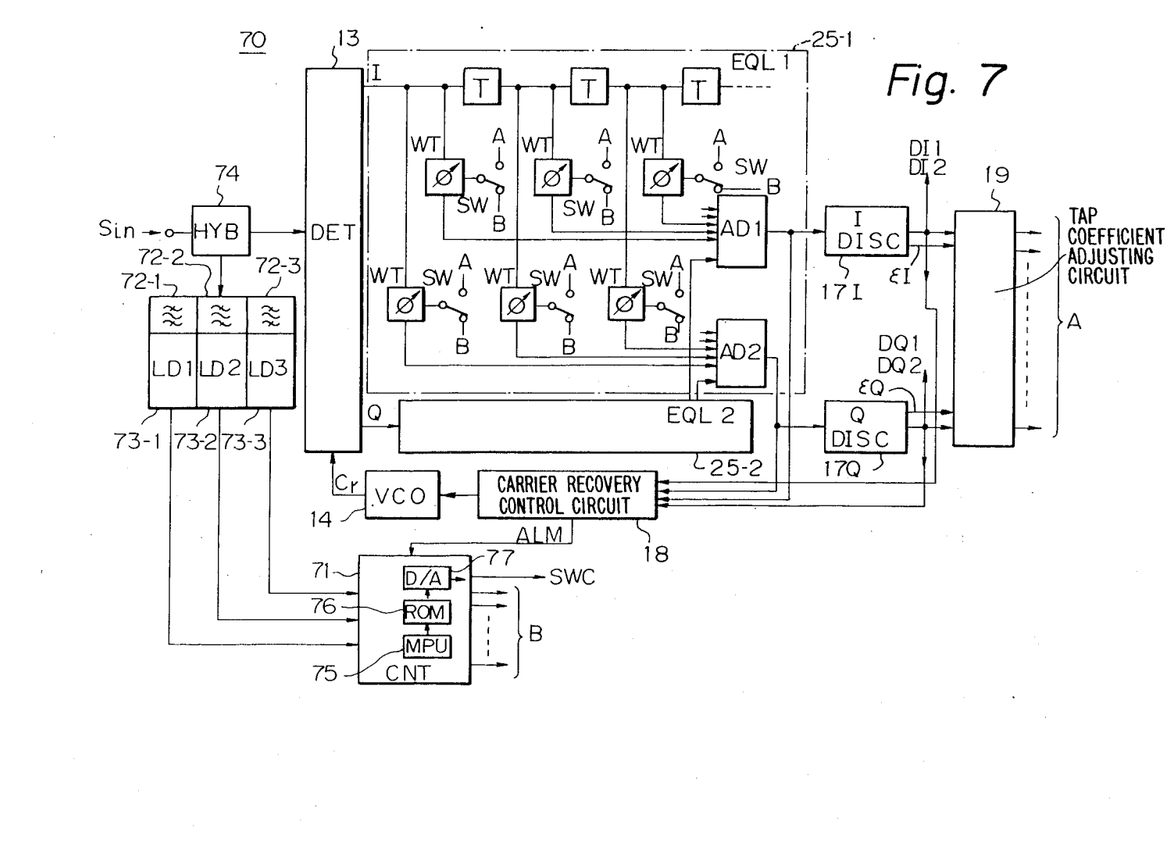
FIG. 7 is a general block diagram of a digital radio receiving apparatus according to a second embodiment of the present invention.

FIG. 7 is a general block diagram of a digital radio receiving apparatus according to a second embodiment of the present invention. In FIG. 7, the digital radio receiving apparatus 70 is controlled by a control circuit (CNT) 71. The control circuit 71 produces a switch control signal SWC and control signals B, similar to the control circuits 21 and 51. The difference here is that the control circuit 71 cooperates with a distortion detecting part. The distortion detecting part is specifically illustrated, in FIG. 7, as a plurality of narrow band filters 72-1, 72-2, and 72-3 and a plurality of level detectors (LD) 73-1, 73-2, and 73-3 for each of these filters. The IF received signal $S_{in}$ is commonly applied, via a hybrid circuit (HYB) 74, to respective filters 72-1 through 72-3. The filters 72-1, 72-2, and 72-3 have filtering frequencies $f_1$, $f_2$, and $f_3$ (FIG. 8) and extract respective frequency components from the signal $S_{in}$. This can be understood with reference to FIG. 8.

Figure 8:
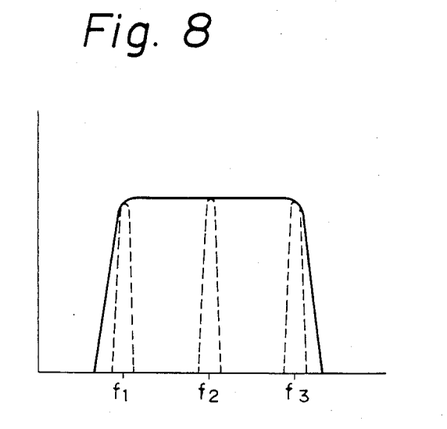
FIG. 8 is a frequency spectrum graph for illustrating the filtering operations achieved by filters of the apparatus illustrated in FIG. 7.

FIG. 8 is a frequency spectrum graph for schematically explaining the filtering operations achieved by the filters 72-1, 72-2, and 72-3 of FIG. 7. The thus filtered frequency components ($f_1$, $f_2$, $f_3$) are supplied to respective level detectors 73-1, 73-2, and 73-3. Then, each detector operates, for each individual frequency component, to detect the power level thereof. The thus detected power levels are input to the control circuit 71 so as a distortion signal which represents an input spectrum of the signal $S_{in}$. In other words, the detected power levels represent a spectrum which varies in accordance with the waveform distortions of the IF received signals $S_{in}$.

Figure 9A:
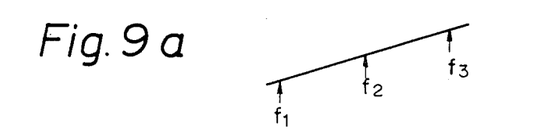
FIGS. 9a-9d display four kinds of typical input spectrums.
Figures 9B, 9C:
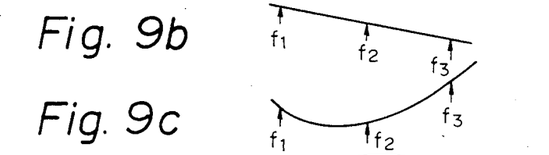
Figure 9D:
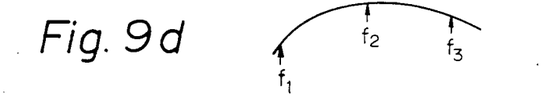

When the alarm signal ALM is generated, the control circuit 71 starts discriminating what distortion mode is now exhibited, from the detected power levels. FIG. 9 displays four kinds of typical input spectrums. Row (a) represents a first order distortion mode in one direction, row (b) the first order distortion mode in the other direction, row (c) a second order distortion mode in one direction, and (d) the second order distortion mode in another direction. The distortion modes can be ordered (a), (b), (c), and (d) in terms of tendency to occur. Generally, the relationship between the input spectrum and optimum pulse response is known. Therefore, when the control circuit 71 is activated by the alarm signal ALM, the circuit 71 provides the signal SWC and starts analyzing the input spectrum. If the circuit 71 finds that the present input spectrum has the characteristic of, for example, the first order distortion mode (refer to row (a) of FIG. 9), it determines and produces the optimum control signals (tap coefficients) B for suppressing the related first order distortion mode. In this case, the transversal equalizers 25-1 and 25-2 operate with the thus determined tap coefficients (B). Accordingly, the carrier recovery circuit (14, 18) is rapidly restored to its synchronization state, i.e., normal operation state, even through the signal $S_{in}$ suffers from the first order distortion.

Figure 10:
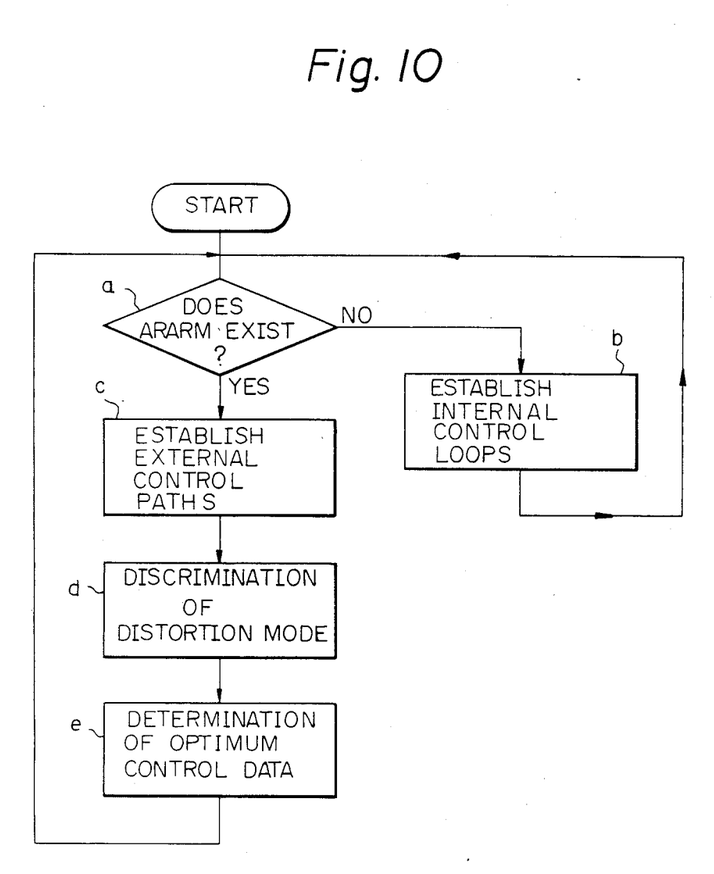
FIG. 10 is a flow chart of successive steps processed under control of the microprocessor unit shown in FIG. 7.

The control circuit 71 preferably contains therein a microprocessor unit (MPU) 75 which works to determine the optimum tap coefficients for respective modes of distortions. FIG. 10 is a flow chart of successive steps processed under control of the microprocessor unit 75 shown in FIG. 7. The steps "a", "b", and "c" are identical to those shown in FIG. 3. In step "d" of FIG. 10, discrimination of the distortion mode is achieved. Then, the optimum the control data regarding the tap coefficients is determined by accessing a ROM 76 in response to the thus discriminated distortion mode and applied, via a D/A converter 77 and as the control signals B, to the equalizers 25-1, 25-2.

Figure 11:
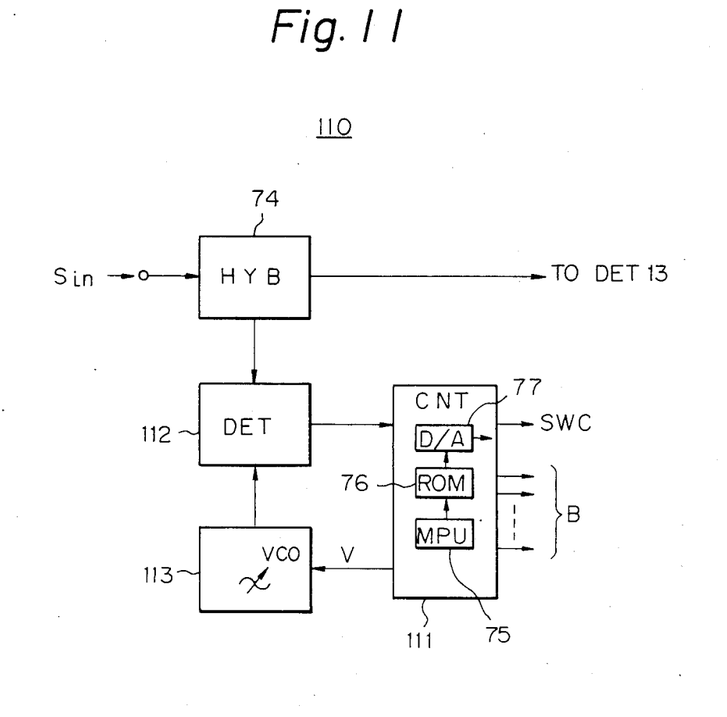
FIG. 11 is a block diagram illustrating a part of a modification of the digital radio receiving apparatus shown in FIG. 7.

FIG. 11 is a part of a modification of the digital radio receiving apparatus 70 shown in FIG. 7. The apparatus 110 utilizes a different type of distortion detecting part from that of the apparatus 70. That is, the distortion detecting part is specifically comprised of a detector (DET) 112 and a voltage controlled oscillator (VCO) 113. The related control voltage V is swept and supplied from a control circuit 111 to vary the oscillation frequency of the VCO 113. The output signal having the variable oscillation frequency is sequentially applied to the detector 112 in which power detection is achieved for the IF received signal $S_{in}$, branched at the hybrid circuit 74, at each frequency supplied by the VCO 113. The power detection signal from the detector 112 is supplied to the control circuit 111, which then discriminates the input spectrum of the signal $S_{in}$ and determines the optimum control signals B, as in the control circuit 71.

The following table shows one example of relative transversal tap control voltages to be applied to individual weighting elements WT shown in FIGS. 2 and 7 for equalizing distortions due to fading.

In the top row of the table, $C_{-2}$, $C_{-1}$, $C_0$, $C_1$, and $C_2$ represent taps and correspond to the weighting elements WT arranged at the upper side in FIGS. 2 and 7, $C_0$ denoting a center tap, while $D_{-2}$, $D_{-1}$, $D_0$, $D_1$, and $D_2$ represent taps and correspond to the weighting elements WT arranged at the lower side in FIGS. 2 and 7, $D_0$ denoting a center tap, but here used for the VCO control of the carrier recovery circuit. The data in the table was obtained through fading simulation for various distortions entered into the IF spectrum. The tap control voltages are measured by means of an indicator for monitoring the tap control voltage. The measured voltages are relative values classified into 10 values, i.e., $-5$, $-4$, $-3$, ... $+3$, $+4$, and $+5$. Each value "0" denotes that the corresponding weighting element has no effect on the signal from the associated tap. Each symbol, "+" denotes that the pulse amplitude is corrected, at the corresponding sampling point, with the same polarity as that of this point, and each symbol "−" denotes conversely that the pulse amplitude is corrected, at the corresponding sampling point, with the opposite polarity as that of this point. Each term "5 dB/±25 MHz" denotes a scale defining a relationhship between a depth of notch from an unfaded level in dB and a frequency offset of one notch. Each term "minimum phase" represents a case where $R/r>1$ stands, while each term "non-minimum phase" represents a case where $R/r<1$ stands. The symbols r and R indicate levels of the received signals transmitted along a direct path and an indirect path, respectively.

The above recited table teaches the following.

(1) If the center frequency of the fading (notch frequency) ocurs at 110 MHz, i.e., the first order distortion shown in row (a) of FIG. 9 exists, the aforesaid control signals B are determined to significantly change the taps of $D_k(K=-2, -1, 1, 2)$.

This is also true of the case where the center frequency of the fading occurs at 170 MHz, i.e., the case of row (b) of FIG. 9.

(2) If the notch frequency is set at 140 MHz, i.e., symmetrical distortion exists, the control signals B are determined to not significantly change the taps $D_k$, but only taps $C_r(r=-2, -1, 0, +1, +2)$ are significantly affected.

(3) If such fading occurs that the minimum phase and the non-minimum phase indicate the same depth, but the delays thereof are inverted, the taps $C_r$ and $D_k$ display similar variations. Accordingly, the control signals B are determined to realize such similar variations between $C_r$ and $D_k$.

(4) If a first order distortion occurs, the tap $C_0$ is the only tap $C_i$ which is varied a large amount. This means

TABLE

Figure 12A:
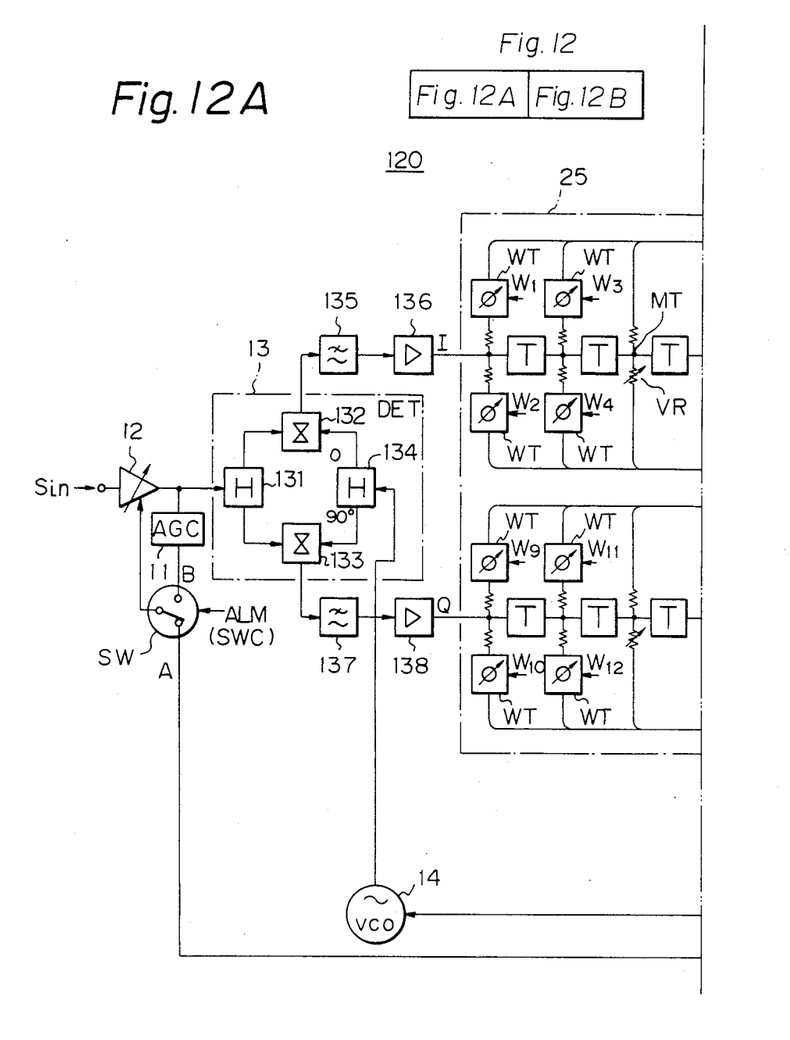
FIG. 12 is a block circuit diagram of a digital radio receiving apparatus according to a third embodiment of the present invention.

| Fading | Tap control voltage | In-phase part | | | | | Quadrature part | | | | |
|---|---|---|---|---|---|---|---|---|---|---|---|
| | | $C_{-2}$ | $C_{-1}$ | $C_0$ | $C_1$ | $C_2$ | $D_{-2}$ | $D_{-1}$ | $D_0$ | $D_1$ | $D_2$ |
| 110 MHz ($f_1$) | Minimum Phase 5 dB/±25 MHz | −1 | +1 | +3 | +1 | −2 | 0 | +2 | / | −5 | +2 |
| | Non-Minimum Phase 5 dB/±25 MHz | −2 | −1 | +4 | +1 | 0 | −1 | +5 | / | −3 | +1 |
| 140 MHz ($f_2$) | Minimum Phase 5 db/±25 MHz | −1 | +4 | +5 | +5 | +3 | 0 | −1 | / | 0 | 0 |
| | Non-Distortion Residual Error | 0 | 0 | −0.5 | +1 | 0 | 0 | −2 | / | 0 | −0.5 |
| | Non-Minimum Phase 5 dB/±25 MHz | +3 | +5 | +3 | +4 | −1 | 0 | −2 | / | 0 | 0 |
| 170 MHz ($f_3$) | Minimum Phase 5 dB/±25 MHz | 0 | +1 | +4 | +1 | −1 | 0 | −4 | / | +5 | −2 |
| | Non-Minimum Phase 5 dB/±25 MHz | 0 | −1 | +4 | 0 | 0 | +1 | −5 | / | +3 | −2 | that the first order distortion is very relevant for the AGC 11 (FIG. 12A).

(5) If the second order distortion occurs, the taps $C_r$ of the in-phase part vary considerably. Accordingly, the control signals B are determined to significantly vary only the taps $C_r$.

(6) Regarding the taps at 110 MHz and 170 MHz, which are symmetric under first order distortion, the taps $C_r$ exhibit similar variations at 110 MHz and 170 MHz under second order distortion; however, the taps $D_k$ exhibit opposite variations. Accordingly, the control signals B are so determined to realize such variations of $C_r$ and $D_k$.

Figure 12B:
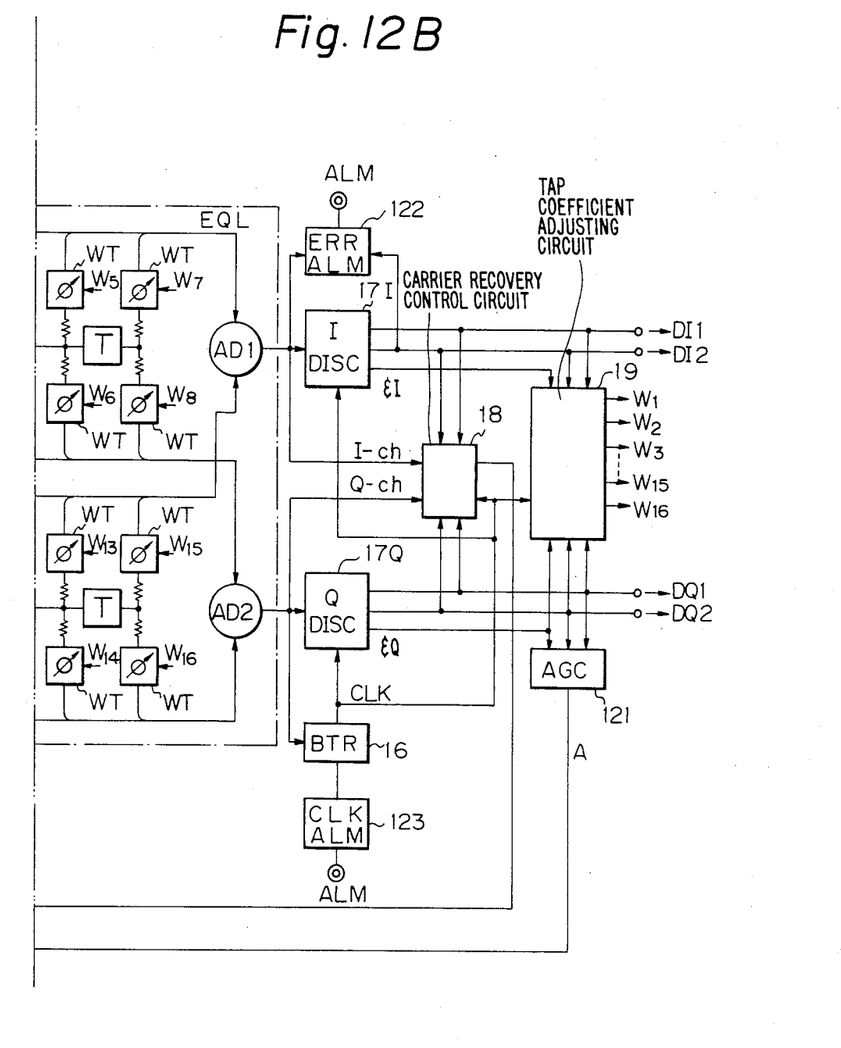

FIG. 12 is a block circuit diagram of a digital radio receiving apparatus 120 according to a third embodiment of the present invention. The circuit elements are illustrated in somewhat more detail than in previous figures. The digital radio receiving apparatus 120 of the third embodiment utilizes a simpler external control path, because most of the waveform distortion can be equalized by suitably setting a weight of the main tap (refer to MT in the transversal equalizer 25). The weight of the main tap MT can be changed equivalently by the gain of the variable gain amplifier 12. As a result, the aforesaid switches SW, the control circuit (CNT), the internal control loop (A), and the external control path (B), which are features of the present invention, all affect only the variable gain amplifier 12 in this embodiment. Therefore, the weighting element WT for the main tap is preferably omitted from the equalizer 25 from an economical viewpoint. Instead the weighting value for the main tap is initially preset to a certain value by means of a variable resistor VR. Other weighting elements WT are controlled by individual weighting values W1 to W16 supplied from the tap coefficient adjusting circuit (TPA) 19.

The internal control loop (A) is established by a line connected via switch SW between an automatic gain controller (AGC) 121 at the output side and the control input of the variable gain amplifier 12. The external control path (B) is connected between the independent AGC 11 at the input side of the receiving apparatus 120 and the amplifier 12 via switch SW. The switch SW is operated by the control switch signal SWC, which is here the alarm signal ALM itself. When the alarm signal ALM is generated, the switch SW operates to supply the AGC signal from the AGC 11 to the amplifier 12. Thus, it should be noted that the control circuit CNT of the previous embodiments is realized by the AGC 11. This will lead to reduction of cost. When the alarm signal ALM is generated, the carrier recovery circuit (14, 18) can no longer maintain the synchronization normally. Therefore, the control signal from the AGC 121 is not reliable and must be ignored. The thus ignored control signal is rejected by the switch SW. At the same time, the control signal from the AGC 11 is made available to cope with the distortion of the signal $S_{in}$ rapidly.

The alarm signal can be supplied not only by the carrier recovery control circuit 18, as in the preceding embodiments, but also a usual error rate detector 122 as signal ALM or usual clock error detector 123 as signal ALM'. In the third embodiment, the alarm signal ALM from the detector 122 will be used.

The detector (DET) 13 is constructed by an in-phase hybrid circuit 131, detectors 132 and 133, and 90° hybrid circuit 134 connected to the VCO 14. The synchronous detection signal from the detector 132 is supplied to the I-ch equalizer via a low pass filter 135 and an amplifier 136. The synchronous detection signal from the detector 133 is supplied to the Q-ch equalizer via a low pass filter 137 and an amplifier 138.

As explained above in detail, the digital radio receiving apparatus of the present invention can rapidly be restored to its normal operation state even though a sudden reduction in quality of the radio transmission line takes place.

I claim:

1. A digital radio receiving apparatus receiving an intermediate frequency signal, comprising:
    a transversal demodulator, comprising:
        a detector operatively connected to receive the intermediate frequency signal;
        a transversal equalizer, operatively connected to said detector, for producing an equalized signal;
        a carrier recovery circuit operatively connected to said transversal equalizer; and
        an equalizing part, operatively connected to said carrier recovery circuit, for producing an internal control signal;
    a discriminator, operatively connected to said equalizing part, said carrier recovery circuit and to receive the equalized signal, for converting the equalized signal into a reproduced data signal and supplying the reproduced data signal to said equalizing part to produce the internal control signal;
    an internal control loop operatively connecting said equalizing part and said transversal equalizer to supply the internal control signal;
    alarm providing means for providing an alarm signal in dependence upon abnormal operation of said transversal demodulator after normal operation has begun;
    a control circuit, operatively connected to said alarm providing means, for providing one of a plurality of external control signals capable of correcting the abnormal operation of said transversal demodulator and thereby eliminating the alarm signal; and
    at least one external control path operatively connecting said control circuit to said transversal demodulator to supply the external control signal.

2. An apparatus as set forth in claim 1, further comprising at least one switch, operatively connected to said alarm providing means, said internal control loop, said external control path and said transversal equalizer, for supplying the transversal equalizer with the internal control signal under normal operation of said transversal demodulator and the external control signal when the alarm signal is provided.

3. An apparatus as set forth in claim 2, wherein said control circuit comprises:
    a read only memory for storing a variety of external control data, prepared in advance, on which the external control signal is based; and
    reading means for sequentially reading different items of the external control data from the read only memory and for supplying the external control signal until the alarm signal is eliminated.

4. An apparatus as set forth in claim 3, wherein said reading means comprises a microprocessor unit operatively connected to said alarm providing means, said read only memory and said switch.

5. An apparatus as set forth in claim 3, wherein said reading means comprises:
    a counter, operatively connected to said alarm providing means and said read only memory, for sequentially supplying address signals to said read only memory; and output means for outputting the external control signal.

6. An apparatus as set forth in claim 2, further comprising a distortion detecting part, operatively connected to said control circuit and to receive the intermediate frequency signal, for detecting distortion in the intermediate frequency signal, and wherein said control circuit determines an optimum external control signal for eliminating the alarm signal in dependence upon the distortion detected by said distortion detecting part.

7. An apparatus as set forth in claim 6, wherein said distortion detecting part comprises:

a plurality of filters, each having different filtering frequencies and each operatively connected to receive the intermediate frequency signal; and level detectors, operatively connected to said filters, respectively, and to said control circuit, for supplying output signals to said control circuit indicating the distortion in the intermediate frequency signal, and wherein said control circuit determines the optimum external control signal in dependence upon the output signals from said level detectors.

8. An apparatus as set forth in claim 6, wherein said distortion detecting part comprises:

a voltage controlled oscillator, operatively connected to and controlled by said control circuit, for producing sequentially varied frequency oscillation signals; and a detector, operatively connected to said voltage controlled oscillator, said control circuit and to receive the intermediate frequency signal, for generating a power detection signal indicating a power level of the intermediate frequency signal at each frequency of the sequentially varied frequency oscillation signals, and wherein said control circuit determines distortion present in the intermediate frequency signal in dependece upon the power detection signal.

9. An apparatus as set forth in claim 1, wherein said transversal demodulator further comprises a variable gain amplifier, operatively connected to said detector, said control circuit and to receive the intermediate frequency signal, said variable gain amplifier being gain controlled by the internal control signal from said equilizing part, and wherein said control circuit comprises:

a switch, operatively connected to said internal control loop, said external control path, said alarm providing means and said variable gain amplifier, for connecting said variable gain amplifier to said external control path when the alarm signal is issued and otherwise connecting said variable gain amplifier to said internal control loop; and an automatic gain controller, operatively connected to said variable gain amplifier and said external control path, for providing the external control signal.

10. An apparatus as set forth in claim 9, wherein said transversal equalizer comprises:

a main tap operatively connected to said detector, said discriminator and said carrier recovery circuit; and a variable resistor, operatively connected to said main tap, said discriminator and said carrier recovery circuit, initially preset to a predetermined value to provide a related weighting value for said main tap.

11. A digital radio receiving apparatus operatively connected to receive an intermediate frequency signal representing original data, comprising:

transversal demodulator means, operatively connected to receive the intermediate frequency signal, for providing weighting values and for converting the intermediate frequency signal into reproduced data corresponding to the original data, in dependence upon thhe weighting values;

internal control means for generating an internal control signal in dependence upon the reproduced data, said transversal demodulator means providing the weighting values in dependence upon the internal control signal during normal operation of said transversal demodulator means;

alarm means for providing an alarm signal when said transversal demodulator means operates abnormally; and external control means for generating an external control signal in response to the alarm signal, the external control signal repeatedly adjusting the weighting values until said transversal demodulator means is restored to normal operation.

12. An apparatus as set forth in claim 11, wherein said transversal demodulator means comprises:

weighting means for converting the intermediate frequency signal into weighted signals in dependence upon the weighting values; and switch means, operatively connected to said internal and external control means and said weighting means, for supplying one of the internal and external control signals to said weighting means.

13. An apparatus as set forth in claim 12, wherein said external control means comprises:

a read only memory containing external control data; and processing means, operatively connected to said alarm means, said read only memory and said transversal demodulator means, for producing the external control signal by reading the external control data from said read only memory when the alarm signal is provided.

14. An apparatus as set forth in claim 13, wherein the original data is transmitted using a carrier signal, wherein said transversal demodulator means further comprises:

carrier recovery means for recovering the carrier signal from the intermediate frequency signal as a recovered carrier signal; and a detector, operatively connected to said carrier recovery means, said weighting means and to receive the intermediate frequency signal, for synchronous detection of the intermediate frequency signal using the recovered carrier signal, and wherein said apparatus further comprises discriminating means, operatively connected to said weighting means and said carrier recovery means, for discriminating levels of the weighted signals to produce the reproduced data.

15. An apparatus as set forth in claim 13,
wherein the original data is transmitted using a carrier signal,
wherein said transversal demodulator means further comprises:
  carrier recovery means for recovery the carrier signal from the intermediate frequency signal as a recovered carrier signal; and
  a detector, operatively connected to said carrier recovery means and said weighting means, for synchronous detection of the weighted signals using the recovered carrier signal to produce a detected signal, and
wherein said apparatus further comprises discriminating means, operatively connected to said detector and said carrier recovery means, for discriminating a level of the detected signal to produce the reproduced data.

16. An apparatus as recited in claim 12, wherein said external control means comprises:
  a counter, operatively connected to said alarm means, for generating address singals;
  a read only memory, operatively connected to said counter, for outputting external control data in dependence upon the address signals; and
  output means for outputting the external control data from said read only memory as the external control signal.

17. An apparatus as recited in claim 12,
further comprising distortion detection means, operatively connected to said external control means and to receive the intermediate frequency signal, for supplying a distortion signal to said external control means by detecting the distortion in the intermediate frequency signal, and
wherein said external control means changes the external control signal in dependence upon the distortion signal when the alarm signal indicates abnormal operation of said transversal demodulator means.

18. An apparatus as recited in claim 17, wherein said distortion detection means comprises:
  filters, operatively connected to receive the intermediate frequency signal, for producing filtered signals from the intermediate frequency signal, each filter tuned to a different frequency within a frequency band; and
  detectors, operatively connected to said filters, respectively, and said external control means, for detecting power levels of the filtered signals, respectively, and supplying the distortion signal to indicate the power levels.

19. An apparatus as set forth in claim 17, wherein said distortion detection means comprises:
  a voltage controlled oscillator, operatively connected to said external control means, for repeatedly supplying a series of oscillation frequency signals within a frequency band; and
  a detector, operatively connected to said voltage control oscillator, said external control means and to receive the intermediate frequency signal, for synchronously detecting a power level of the intermediate frequency signal at each frequency of the oscillation frequency signals to supply the distortion signal to said external control means.

20. An apparatus as set forth in claim 11,
wherein said external control means comprises an automatic gain controller, operatively connected to receive the intermediate frequency signal, for generating the external control signal from the intermediate frequency signal, and
wherein said apparatus further comprises:
  a variable gain amplifier, operatively connected to said transversal demodulator means and said automatic gain controller, for producing an amplified intermediate frequency signal; and
  a switch, operatively connected to said alarm means, said automatic gain controller, said internal control means and said variable gain amplifier, for supplying the variable gain amplifier with the internal control signal under normal operation and with the external control signal when the alarm signal is provided.

21. An apparatus as set forth in claim 20, wherein said transversal demodulator means comprises:
  a detector, operatively connected to said variable gain amplifier, for detecting a power level of the amplified intermediate frequency signal;
  time delay elements operatively connected in series to said detector;
  taps, respectively connected to said time delay elements, including a main tap substantially centered in the series of said time delay elements;
  weighting elements, operatively connected to said internal control means and said taps other than the main tap, for providing weighted signals having weighting levels varying in dependence upon the internal control signal;
  a variable resistor, operatively connected to said main tap, for providing a predetermined fixed weighting level to produce a main weighted signal; and
  discriminating means, operatively connected to said weighting elements and said variable resistor, for converting the weighted signals and the main weighted signal into the reproduced data.

* * * * *

UNITED STATES PATENT AND TRADEMARK OFFICE
CERTIFICATE OF CORRECTION

PATENT NO. : 4,656,644

DATED : April 7, 1987

INVENTOR(S) : Takayuki Ozaki

It is certified that error appears in the above-identified patent and that said Letters Patent is hereby corrected as shown below:

```
Column 1, line 10, "having of" should be --having--.
Column 7, line 24, delete "the" (second occurrence);
IN THE TABLE:  between lines 6 and 7, insert dashes -- - --
         through the table;
         line 8, col. 2, "db/" should be --dB/--;
         between lines 12 and 13, insert dashes -- - --
         through the table.
Column 11, line 43, "dependece" should be --dependence--;
         line 51, "equilizing" should be --equalizing--.
Column 12, line 16, "thhe" should be --the--.
Column 13, line 6, "recovery" (second occurrence) should be
         --recovering--;
         line 25, "outputing" should be --outputting--.
```

Signed and Sealed this

First Day of September, 1987

Attest:

Attesting Officer

DONALD J. QUIGG

Commissioner of Patents and Trademarks